June 23, 1936.  K. RABE  2,044,809
STEERING ARRANGEMENT FOR POWER DRIVEN VEHICLES
Filed Jan. 18, 1934   2 Sheets—Sheet 1
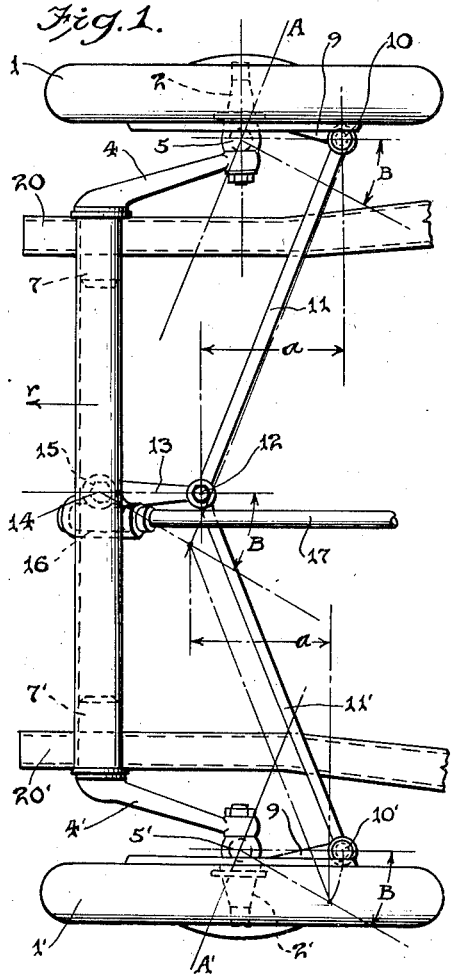
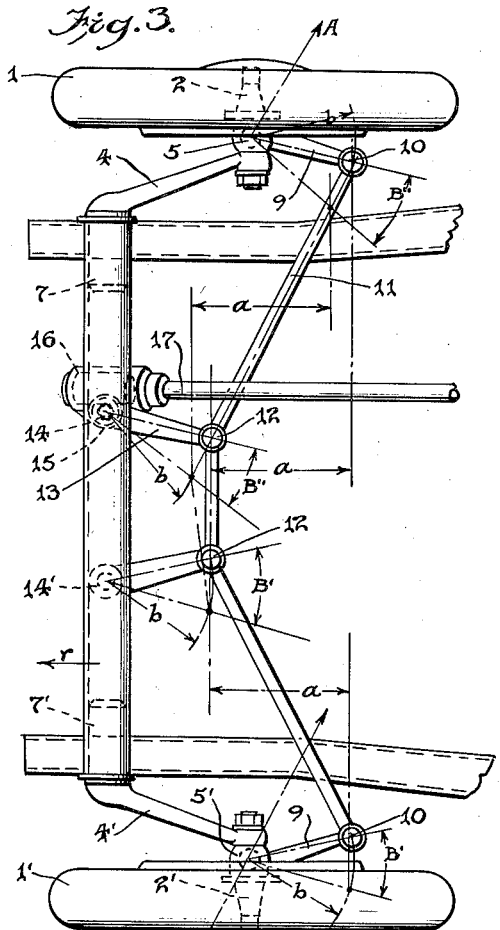
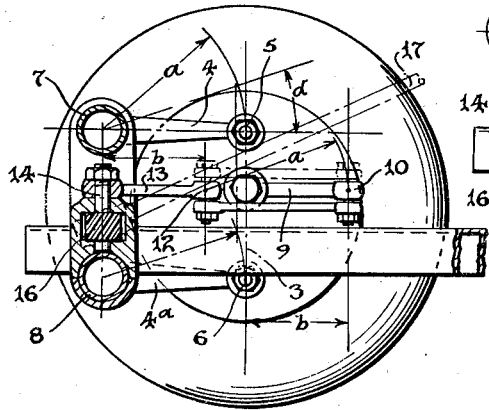
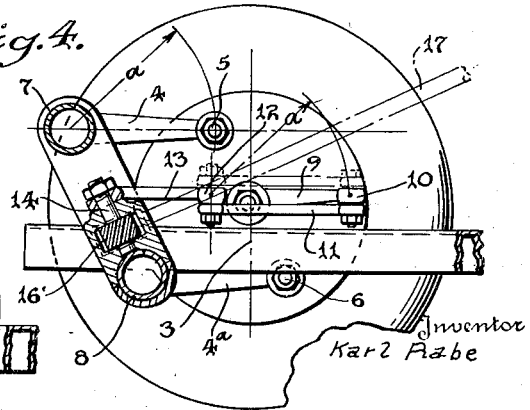
Inventor
Karl Rabe
By Emil Bömelybe
Attorney

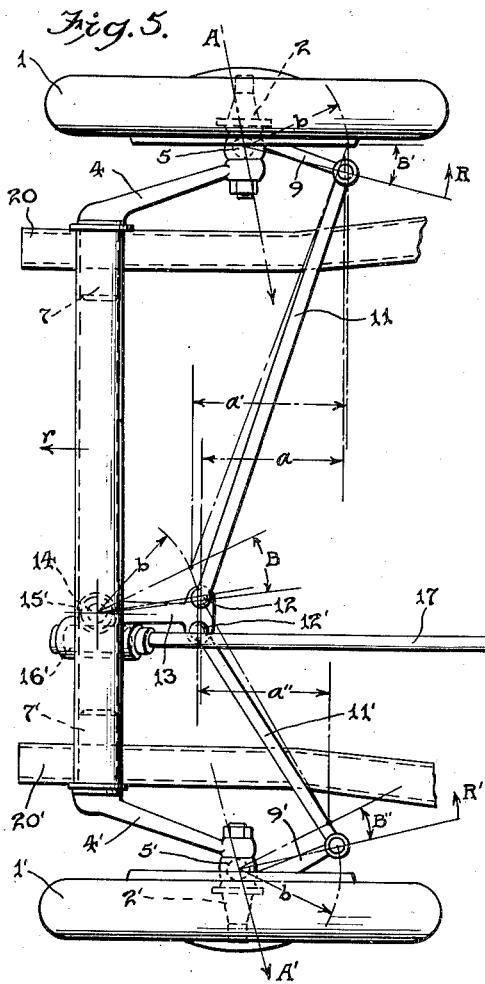

Patented June 23, 1936

2,044,809

UNITED STATES PATENT OFFICE 2,044,809

STEERING ARRANGEMENT FOR POWER-DRIVEN VEHICLES

Karl Rabe, Stuttgart, Germany

Application January 18, 1934, Serial No. 707,094
In Germany January 18, 1933

6 Claims. (Cl. 280—96)

This invention relates to a steering arrangement for power-driven vehicles with independently sprung steering wheels swinging parallel to the longitudinal axis of the vehicle which are supported with respect to the frame by jointed link parallelograms or quadrilaterals, or other suitable means and guided by divided gauge rods.

The object of the present invention is the provision of a construction in which the distance of the inner from the outer bearing point of the gauge rod when projected on to the plane of oscillation of the steering wheels is equal to the length of the projection of the carrying lever on this plane. In such a construction the outer bearing points of the gauge rod describe exactly the circular arcs determined by the parallel guides of the steering arms so that the steering is quite unaffected by any movement of the wheels. The gauge rods themselves move over the surface of a right circular cone, the vertex of which coincides with the inner bearing point of the gauge rod. This condition must always be fulfilled in the running position of the wheels, that is, when travelling in a straight line whatever position and length the supporting gauge lever may have.

These advantages can now be obtained according to the invention also for any steering position of the wheels, that is when travelling round curves if the steering lever and the gauge lever are also of equal length and similarly directed. In this case the steering lever, gauge lever and gauge rod form a parallelogram or quadrilateral which positively maintains the correct mounting of the gauge rod for any steering deflection. It is immaterial for this condition what position and what length the steering and gauge levers possess. On account of this arrangement a completely independent steering arrangement is obtained which could only be obtained approximately hitherto with wheels guided so as to swing.

Several constructional examples of the invention are illustrated diagrammatically in the accompanying drawings.

Fig. 1 is a plan view of the steering arrangement.

Fig. 2 is the corresponding elevation.

Fig. 3 is a second constructional form in plan.

Fig. 4 a further constructional form in elevation.

Fig. 5 a third construction in plan.

Fig. 6 the corresponding elevation.

Fig. 7 a fourth construction in plan and

Fig. 8 the corresponding elevation.

The steering road wheel 1 may be mounted in a known manner on the journal 2 of the steering link 3. The steering link 3 may be mounted at the outer ends of the carrying links 4, 4a in ball joints 5, 6 which permit the swinging and also the steering movement of the wheel 1. The supporting links 4, 4a are mounted so as to be rotatable on the frame 20 transversely to the direction of travel $r$ in journals 7, 8. The pivot points 5, 6 and 7, 8 determine in the middle position an articulated rectangular link system which, when the wheel 1 yields, is positively converted into a parallelogram for example, by rotation through the angle $a$, the steering link 3 being guided parallel to itself and to the longitudinal axis of the vehicle. The wheel 1 thus when yielding alters neither its track nor its plane of rotation so that no additional turning moments can be produced. The journals 7, 8 of the supporting links 4, 4a are assumed to be connected with rotary springs of any kind engaging coaxially with them which produce the restoring forces for the wheel movement.

There is connected with the steering link 3 a gauge lever 9 which makes possible the steering movement of the wheel through divided gauge rods 11, 11'. The outer ends of the gauge rods are connected through ball joints 10, 10' with the gauge levers 9, 9' and the inner ends of the gauge rods are connected by a ball joint 12 with the steering lever 13 arranged in the longitudinal central plane of the vehicle. The gauge rods 11, 11' are placed at an angle to one another in such a manner that the distance of the inner bearing point 12 from the outer bearing points 10, 10' when projected on to the plane of swinging of the wheels 1, 1' is equal to the length $a$ of the projection on this plane of the supporting links 4, 4a.

The steering lever 13 is mounted in the frame in a journal 14 with axis of rotation parallel to the steering pins 5, 6. The gauge levers 9, 9' and steering lever 13 are of equal length and similarly directed and are parallel to the longitudinal central plane of the vehicle. The journal 14 of the steering lever 13 is driven in a known manner from the steering column 17 through a helical gear 15, 16 by which means the steering lever 13 can be displaced on either side through an angle $\beta$.

If, for example, the wheel 1 yields upwardly the pivot points 5, 6 describe circular tracks of radius $a$ in the plane of swinging. Each point of the steering link 3, that is also the outer bearing point 10 of the gauge rod 11, describes a similar circular path according to the parallelogram rule. The inner bearing point of the gauge rod 11, however, remains at rest since it lies in the theoretical swinging axis of the bearing point 10. The gauge rod 11 during the yielding of the wheel 1 thus travels over a conical surface, the apex of which is formed by the stationary point 12 and the base by the point 10 which moves in a circle. Since the generating lines of this right circular cone are all equal, the gauge lever 9 cannot alter its original position with respect to the supporting links 4, 4a so that the steering is not affected by the yielding of the wheel 1.

These conditions are not altered if the steering lever 13 is intentionally moved through the helical gearing 15, 16. The gauge rods 11, 11' together with the gauge levers 9, 9' and the steering lever 13 form a parallelogram which controls the gauge rods 11, 11' parallel to themselves. If the steering lever 13, for example, is turned through the angle $\beta$, the bearing points 10, 10' and 12 describe equal circular paths of radius $b$. In this way the distance $a$ of the inner bearing point 12 from the outer bearing points 10, 10' remains the same in each steering position of the wheels 1, 1' and since the inner bearing point 12 is always guided back positively into the theoretical swinging axis of the outer bearing points 10, 10' the steering itself remains unaffected. With this arrangement of the gauge rods 11, 11', the steering is completely independent of the springing not only in the normal running position (travel in a straight line) but also in every steering position (travel in a curve) of the wheels 1, 1'.

The steering arrangement according to Fig. 1 has the disadvantage that the wheel axles A, A' remain parallel to one another in all steering positions. The wheels 1, 1' will therefore not only roll in the curve but will also slide, which, as is well known, results in wear of the tyres. In order to avoid this in the steering arrangement shown in Fig. 3, the gauge levers 9, 9' are directed inwardly. The steering lever 13 is displaced laterally from the longitudinal central plane of the vehicle and is connected with a guiding lever 13' arranged symmetrically with respect to this plane through a rod 18 to a jointed trapezium. The steering lever 13, gauge rod 11 and gauge lever 9 on one side and the guiding lever 13', gauge rod 11' and gauged lever 9' on the other side form in this case jointed parallelograms connected to the jointed trapezium on both sides. The distance of the inner bearing points 12, 12' from the outer bearing points 10, 10' when projected on the swinging plane of the wheels 1, 1' is again equal to the length $a$ of the projection on the same plane of the supporting levers 4, 4a which are somewhat outwardly directed. Since the bearing points 12, 12' in this case also are positively returned into the theoretical swinging axis of the outer bearing points 10, 10', the mode of operation of this arrangement as compared with the earlier one remains unaltered. If, however, the steering lever 13 is turned by the helical gearing 15, 16, the angle B' through the angle $\beta$ through which the guiding lever 13' is displaced is smaller according to the trapezium rule. The wheel axles A, A' corresponding to the different angles of deflection B'', B' of the wheels 1, 1' intersect in a point which lies on the inner side of the curve and when the steering is properly arranged lies approximately in the extension of the rear axle. With this arrangement, any desired positive deflection of the wheels 1, 1' can thus be obtained while retaining the complete independence of the steering. For simplifying the steering arrangement shown in Fig. 3, that according to Fig. 5 may also be employed. In this arrangement the steering lever 13 is removed from the longitudinal central plane of the vehicle and the two gauge rods 11, 11' of different lengths are each connected with it through a joint 12 or 12'. The condition that the steering lever 13 and gauge levers 9, 9' should be similarly directed cannot be fulfilled in this case. In the running position of the wheels 1, 1', the gauge rods 11, 11' are correctly mounted, that is, the distance of the inner bearing points 12, 12' from the outer bearing points 10, 10' when projected on to the swinging plane corresponds to the length $a$ to the projection on this plane of the supporting link. If, however, the steering lever 13 is turned through the angle $\beta$, the distance $a$ for the gauge rod 11 increases to $a'$, while that for the gauge rod 11' is diminished to $a''$. When the wheels 1, 1' yield they are therefore additionally deflected in the direction R, R'. These reactions, however, are extremely small since the theoretical oscillation circle of the points 10, 10' comes very close to the actual oscillation circle. For the gauge rod 11, the actual swinging circle of radius $a'$ is greater than the theoretical with radius $a$ so that the gauge rod 11 is constrained to press the gauge lever 9 outwardly. Conversely, with the gauge rod 11' the actual swinging circle of radius $a''$ is smaller than the theoretical of radius $a$ so that the gauge rod 11' is constrained to draw the gauged lever 9' inwards. These reactions of the steering rod system may be disregarded in view of the small speed of travel in curves and the simple construction of the steering especially as they only amount to a fraction of those which have to be taken into account with the steering arrangements which are usual at the present day.

The same simplification as obtained by the steering arrangement according to Fig. 5 can also be obtained with that according to Fig. 7. In this the gauge levers 9, 9' are placed further inwards and the equally long gauge rods 11, 11' are pivoted to a toothed rod 22 which is mounted so as to be displaceable transversely in the frame. The toothed rod 22 is moved directly from the steering column 17 by means of a pinion 21. The distance of the toothed rod 22 from the outer bearing points 10, 10' of the gauge rods 11, 11' when projected on to the swinging plane agrees completely with the length $a$ of the projection on the same plane of the swinging links. The toothed rod 22 thus lies in the theoretical swinging axis of the points 10, 10' when travelling in a straight line. If, however, the toothed rod 22 is moved through a distance $x$ the gauge levers 9, 9' will be deflected through different angles B', B'' so that the distance $a$ for the gauged rod 11 will be increased to $a'$ and that for the gauge rod 11' will be diminished to $a''$. The same results are therefore obtained as with the steering arrangement according to Fig. 5.

Since a helical gearing 15, 16 on account of the flanks engaging at points is not always suitable, it is shown in Fig. 4 how a worm gear 15', 16' can be employed for driving the steering lever 13. In this arrangement the steering pin 5, 6 is inclined to the vertical and the steering column 17 is arranged approximately at right angles thereto. In this case the pivot pin 14 of the steering lever 13 can be placed parallel to the steering pin 5, 6 and the gauge lever 9 with the steering lever 13 can be made parallel to the steering column 17 whereby no alteration of the mode of operation described occurs. As long as the steering column 17 and the steering lever 13 are not at right angles to the axis of the steering pin 5, 6, it is possible to obtain with the arrangement according to Fig. 6 a good approximation to the above conditions. In this arrangement the length b' of the steering lever 13 is made such that its projection on a plane at right angles to the steering pin 5, 6 corresponds to the projection on the same plane of the length b of the gauge lever 9. The length b in this case is the diameter of the apex circle of the ellipse obtained by projecting the circular path of the points 12, 12' on to this plane. The unavoidable deviations of the path points 12, 12' from the projection points of this plane then have a minimum value.

It is not absolutely necessary to actuate the steering lever 13 directly through a gearing 15, 16 or 15', 16'. The steering lever 13 can also be actuated indirectly in a known manner through a steering push rod which allows of the arrangement of the steering gear 15, 16 or 15', 16' at any desired distance from the pivot pin 14 of the steering lever 13.

The advantages of the invention are also obtained when the features described are realized by the steering arrangements not exactly but only approximately. The distance of the inner bearing points 12, 12' from the outer bearing points 10, 10' of the gauge rods 11, 11' when projected on to the swinging plane need not therefore coincide exactly with the length $a$ of the carrying lever projections on this plane, nor need the gauge levers 9, 9' and the steering levers 13, 13' be exactly of equal lengths or equally directed if constructional reasons justify the deviations required by the mounting and arrangement of the steering rod system in the vehicle. The deviations required by the transverse oscillations of the vehicle body can at the same time be taken into consideration and even in some cases compensated.

Individual features of the invention may be transferred correspondingly to steering arrangements for independently sprung steering wheels swinging transversely to the longitudinal axis of the vehicle. In this case the gauge rods and carrying levers are of equal length and equally directed. For the complete solution of the independent steering, the construction of a guiding lever corresponding to the steering lever according to the arrangement shown in Fig. 3 is necessary, while for the approximate solution the result can be obtained with a single steering lever according to the arrangement shown in Fig. 5. By the use of any jointed quadrilaterals instead of the jointed parallelograms for guiding the wheels, the above described regularity of the steering is only slightly altered if the lengths of the carrying levers are only slightly different from one another. The distance of the inner from the outer bearing points of the gauge rod when projected on to the swinging plane of the wheels is in this case preferably made equal to the mean length of the carrying lever projections on this plane.

The individual features of the invention can also be combined together in ways different from those illustrated if the mode of operation of the steering thereby remains unchanged. More particularly, the predetermined position of the steering column according to whether left or right hand drive of the vehicle is desired and also the indispensable axle displacement, which, in the constructional examples has been included, must be taken into consideration in fixing the steering arrangement.

The invention is not limited to the several forms illustrated and described, which forms are intended to be merely illustrative and not limiting. Various changes and modifications may be made without departing from the invention as set forth in the claims which follow.

What I claim is:

1. In steering mechanism for power driven vehicles with independently sprung steering wheels, an articulated quadrilateral link system mounted in the vehicle to swing in a plane parallel to the longitudinal axis of the vehicle and including a link supporting the wheel and capable of steering movements and a pair of carrying links jointed to the ends of said steering links, a steering lever, and gauge rods respectively jointedly connecting the steering links of a pair of wheels to the steering lever, the projection of the length of each gauge rod between its joints on the plane of swinging of the link system being substantially equal to the projection of the length of the carrying links on the same plane.

2. In steering mechanism for power driven vehicles with independently sprung steering wheels, an articulated quadrilateral link system mounted in the vehicle to swing in a plane parallel to the longitudinal axis of the vehicle and including a link supporting the wheel and capable of steering movements and a pair of carrying links jointed to the ends of said steering links, a gauge lever extending transversely from each steering link, a steering lever substantially equal in length to the gauge lever, and gauge rods respectively jointedly connecting the gauge levers of a pair of wheels to the steering lever, the projection of the length of each gauge rod between its joints on the plane of swinging of the link system being substantially equal to the projection of the length of the carrying links on the same plane.

3. In steering mechanism for power driven vehicles with independently sprung steering wheels, an articulated quadrilateral link system mounted in the vehicle to swing in a plane parallel to the longitudinal axis of the vehicle and including a link supporting the wheel and capable of steering movements and a pair of carrying links jointed to the ends of said steering links; a steering lever system consisting of a steering lever, a guide lever arranged symmetrically to the steering lever with respect to the longitudinal axis of the vehicle, and a connecting rod jointedly connecting said steering lever and guide lever; and gauge rods jointedly connecting the steering links of a pair of wheels to the steering lever and guide lever respectively, the projection of the length of each gauge rod between its joints on the plane of swinging of the link system being substantially equal to the projection of the length of the carrying links on the same plane.

4. In steering mechanism for power driven vehicles with independently sprung steering wheels; an articulated quadrilateral link system mounted in the vehicle to swing in a plane parallel to the longitudinal axis of the vehicle and including a link supporting the wheel and capable of steering movements and a pair of carrying links jointed to the ends of said steering links; a gauge lever extending transversely from each steering link; a steering lever system consisting of a steering lever substantially equal in length to the gauge lever, a guide lever of similar length arranged symmetrically to the steering lever with respect to the longitudinal axis of the vehicle, and a connecting rod jointedly connecting said steering lever and guide lever; and gauge rods jointedly connecting the steering links of a pair of wheels to the steering lever and guide lever respectively, the projection of the length of each gauge rod between its joints on the plane of swinging of the link system being substantially equal to the projection of the length of the carrying links on the same plane.

5. In steering mechanism for power driven vehicles with independently sprung steering wheels, an articulated quadrilateral link system mounted in the vehicle to swing in a plane parallel to the longitudinal axis of the vehicle and including a link supporting the wheel and capable of steering movements and a pair of carrying links jointed to the ends of said steering links, a steering lever, gauge rods respectively jointedly connecting the steering links of a pair of wheels to the steering lever, the projection of the length of each gauge rod between its joints on the plane of swinging of the link system being substantially equal to the projection of the length of the carrying links on the same plane, a steering column extending at right angles to the steering link, and gearing transmitting the steering force from said column to the steering lever.

6. In steering mechanism for power driven vehicles with independently sprung steering wheels; an articulated quadrilateral link system mounted in the vehicle to swing in a plane parallel to the longitudinal axis of the vehicle and including a link supporting the wheel and capable of steering movements and a pair of carrying links jointed to the ends of said steering links; a gauge lever extending transversely from each steering link; a steering lever substantially equal in length to the gauge lever; gauge rods respectively jointedly connecting the gauge levers with a pair of wheels to the steering lever, the projection of the length of each gauge rod between its joints on the plane of swinging of the link system being substantially equal to the projection of the length of the carrying links on the same plane; a steering column extending at an angle other than a right angle to the steering link; and gearing transmitting the steering force from said column to the steering lever, the projection of the length of the steering lever on a plane at right angles to said link being substantially equal to the projection of the length of the gauge lever in that plane.

KARL RABE.